April 23, 1940. B. GROB 2,198,247
SPEED CONTROL
Filed Oct. 30, 1936 2 Sheets-Sheet 1

Inventor
Benjamin Grob
by Eugene N. Simpson
Attorney

Patented Apr. 23, 1940

2,198,247

UNITED STATES PATENT OFFICE 2,198,247

SPEED CONTROL

Benjamin Grob, Grafton, Wis., assignor of seven-tenths to Grob Bros., Grafton, Wis., a partnership composed of Theodore Grob and himself, and one-fifth to Eugene H. Simpson, West Allis, Wis., and one-tenth to Robert E. Stoll, Wauwatosa, Wis.

Application October 30, 1936, Serial No. 108,345

12 Claims. (Cl. 192—.01)

This invention relates to automotive vehicles, and more particularly to a speed control for use on automotive vehicles employing an internal combustion engine.

Automotive vehicles now in use employ a system of foot brakes which are entirely separate and distinct from the engine. To operate the brakes and bring the vehicle to a stop, it is necessary to remove the right foot from the accelerator, place it on the brake pedal and depress the latter. Each time the brake is depressed wear takes place on the brake bands and drums, necessitating the eventual replacement of the bands.

The compression of the motor when in second gear has long been recognized as a most effective brake, due to its uniform drag on both rear wheels. If the ignition is left on, however, the braking action is never complete, as the car will continue to move forward indefinitely, whereas if the ignition is turned off, gas accumulates in the muffler, causing an explosion in the muffler when the engine is again started. Such an explosion is quite apt to damage the muffler.

High gear, on the other hand, affords little or no braking action, and this is amplified when the ignition is on.

One object of the present invention is to produce a speed control for automotive vehicles which is operated from a single pedal.

Another object of the invention is to produce a speed control for automotive vehicles which is sure and positive in its action.

A further object is to produce a speed control for automotive vehicles which is entirely independent of the friction brakes.

A further object of the invention is to reduce the wear on the ordinary friction brakes on an automotive vehicle.

Another object is to promote cooling of the motor of an automotive vehicle.

A further object is to provide a means of disposing of free carbon deposited in the engine cylinders during burning of the fuel.

Other objects will become apparent on consideration of the following specification which, taken in conjunction with the accompanying drawings, illustrate a preferred form of the invention.

Figures 1, 2, 3:
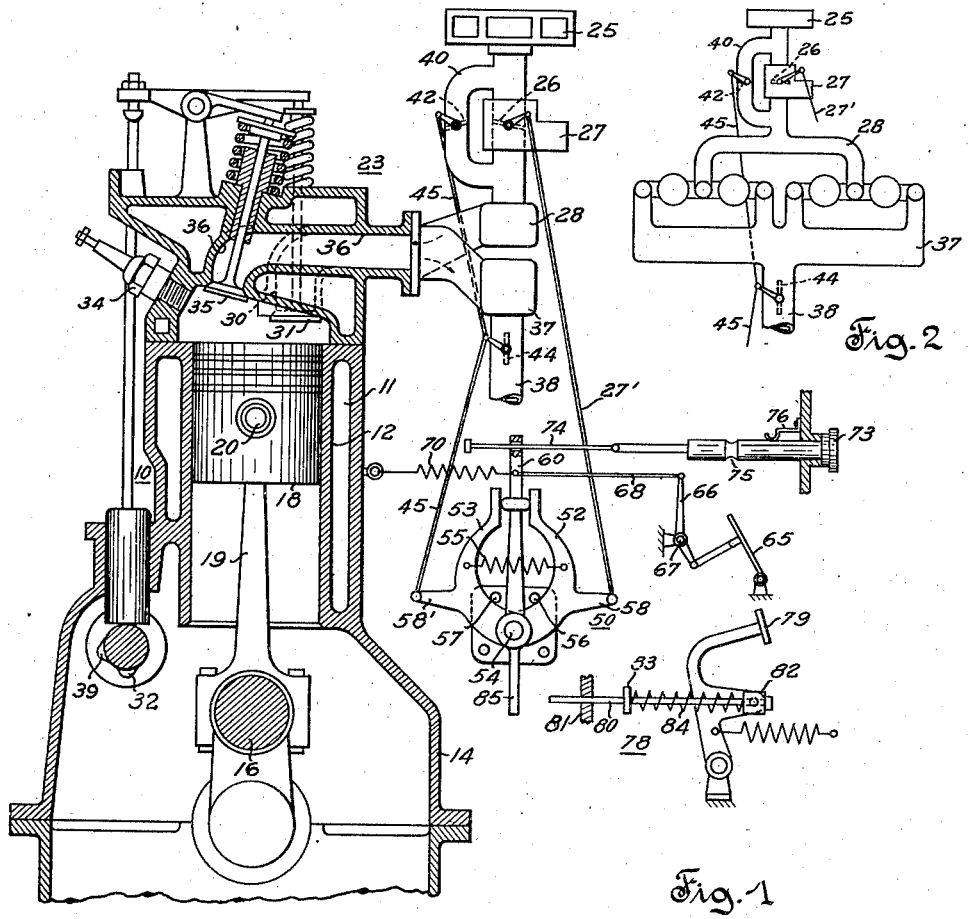
Fig. 1 is a transverse cross-section through a typical four cycle automobile engine showing the speed control attached thereto.
Fig. 2 is a diagrammatic view of the speed control as applied to a four cylinder or a V-8 engine.
Fig. 3 is a view similar to Fig. 2 showing the speed control as applied to a six cylinder or a V-12 engine.

Referring to the drawings, and more particularly to Fig. 1, the engine comprises a cylinder block 10, having a water jacket 11 surrounding cylinders 12. A crank case 14 is attached to the block at the lower end of the cylinders, and houses a crank shaft 16. A piston 18 has a connecting rod 19 connected thereto by a wrist pin 20 and is adapted to turn the crank shaft 16 and produce power. The upper ends of the cylinders 12 are closed by a cylinder head 23 which may be secured to the top of the cylinder block 10 by bolts (not shown).

In the engine shown a mixture of gasoline vapor and air is burned. The air enters an air cleaner 25 and passes through a butterfly valve 26 in the carbureter 27. In passing through the carbureter 27 the air stream absorbs and vaporizes the gasoline in a manner well known in the art. The valve 26 is actuated by a link 27' which is connected to a control mechanism to be described below. From the carbureter the mixture of gasoline and air passes into an intake manifold 28 which distributes the mixture to the various cylinders 12 through inlet passages 30. Each passage 30 is controlled by a valve 31 which is timed to open at the proper time by a cam 32 driven by the engine.

After being compressed the gases are ignited by a spark plug 34 and after expanding are expelled from the cylinder past an exhaust valve 35 through an exhaust passage 36. The passages 36 from all cylinders enter an exhaust manifold 37, which collects the burnt gases and delivers them to a single exhaust pipe 38 which leads to a muffler (not shown).

The valve 35 is opened mechanically by a cam 39, which may be mounted on the same shaft as the cam 32.

According to the present invention a by-pass 40 is provided around the carbureter 27 and is controlled by a valve 42, so that when the valve 42 is open air is drawn through the by-pass 40 into the engine cylinders 12 without passing through the carbureter.

The exhaust pipe 38 likewise has a valve 44 operable therein, which is adapted to completely close the exhaust pipe. The control for the operation of the valves 26, 42 and 44 is so interconnected that the valve 42 is fully closed and the valve 44 fully open as long as the valve 26 is in open or partially open position. The valves 42 and 44 operate simultaneously through a linkage 45 in such a manner that the valve 42 opens as the valve 44 closes. These movements are effected by a control mechanism generally designated 50, and to be described in detail below.

The control mechanism 50 may comprise two levers 52 and 53 which are pivoted on a common pivot 54 and are constantly urged toward each other by a spring 55. Stops 56 and 57 limit the inward movement of the levers 52 and 53 respectively. The links 27' and 45 are connected to the levers 52 and 53 respectively through arms 58 and 58' so that when the lever 53 moves away from the stop 57, the valve 42 is opened and the valve 44 is closed, and as the lever 52 moves away from the stop 56, the butterfly valve 26 is opened to supply gas to the engine.

The levers 52 and 53 are actuated by a single lever 60 which is pivoted on the pivot 54, and moves the lever 53 away from its stop 57 when moved to the left as seen in Fig. 1, and moves the lever 52 away from the stop 56 when moved to the right. This arrangement assures the gas being entirely off before either the valve 42 is opened or the valve 44 is closed.

The lever 60 is actuated primarily from the foot accelerator 65 in the automobile, so that when the accelerator is depressed a link 66 is rotated about its fixed pivot 67 and moves the lever 60 by means of a link 68 to the right, as seen in Fig. 1. This movement, in turn, opens the butterfly valve 26 and causes more gas to be supplied to the engine.

As the pressure on the throttle is released, a spring 70 returns the lever 60 to the neutral position. Further release of pressure on the accelerator permits the spring 70 to move the lever 60 to the left, as seen in Fig. 1. Such movement actuates the lever 53 and simultaneously opens the by-pass valve 42 and closes the exhaust manifold valve 44.

Opening the by-pass valve 42 removes all suction from the butterfly valve 26 and hence all gasoline supply is automatically cut off from the engine.

Closing of the valve 44 builds up pressure in the exhaust manifold against which the pistons 18 must work. The back pressure so built up forms a brake which is utilized to decelerate the vehicle. The pressure in the exhaust manifold never reaches dangerous proportions due to the fact that the air which is compressed and exhausted from one cylinder (considering first a four cylinder engine) acts against the pressure of the spring of the exhaust valve of the cylinder which would normally be firing, opens that valve against the spring pressure and builds up pressure within that cylinder.

Two means are provided to return the lever 53 to the neutral position in which the by-pass valve 42 is closed and the exhaust manifold valve 44 is open. In this position the engine would be drawing some gas through the carbureter and running at idling speed.

A hand throttle control 73 constitutes the first means to return the lever 53 to neutral position. It may be mounted on the dashboard and connected through a flexible cable 74 or other suitable means to the lever 60 in such a way that when pulled out it limits the movement of the lever 60 toward the braking position. The rod of the throttle 73 may be notched as at 75, which notch is engaged by a releasable stop 76 at the idling position of the control mechanism. By pulling out further on the hand throttle, the stop 76 releases and the lever 60 is moved to the right, as seen in Fig. 1, to increase the gas supply to the engine. Sufficient friction is provided between the hand throttle 73 and the dashboard to overcome the effect of the spring 70.

The second means, generally designated 78, to return the lever 53 to neutral position and start the engine idling, is operated from the clutch pedal 79. The means 78 may comprise a push rod 80 slidably received in a pair of guides 81 and 82. The guide 81 is fixed relative to the frame of the machine, whereas the guide 82 is pivotally mounted on the clutch pedal of the machine, as shown.

A stop 83 is fixed on the rod 80 and abuts the guide 81 to limit the forward movement of the rod 80. A spring 84 is mounted around the rod 80 with the two ends abutting the stop 83 and the guide 82 respectively, so that the initial movement inwardly of the clutch pedal moves the rod 80 to the left, as shown in Fig. 1, until the stop 83 abuts the guide 81.

In moving to the left, the rod 80 contacts a depending arm 85 of the lever 60 and returns the control mechanism to idling position.

The various positions of the operating mechanism are shown in Figs. 4, 5, 6 and 7.

Figure 4:
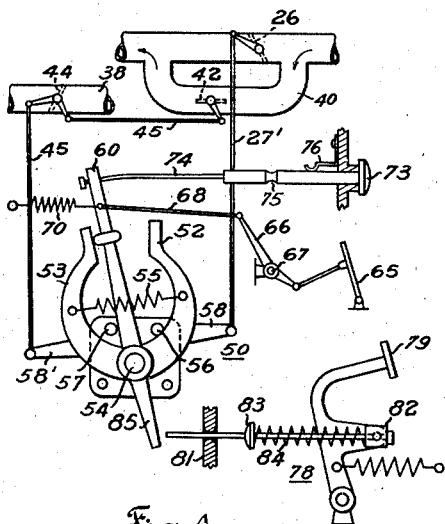
Fig. 4 is a diagrammatic view showing the braking position of the control lever, with the clutch engaged and the hand throttle in "off" position.

Fig. 4 shows the hand throttle pushed in to permit the compression brake to work. In this figure the position of the valves 26, 42 and 44 is shown when the foot is removed from both the accelerator and the clutch pedal.

Figure 6:
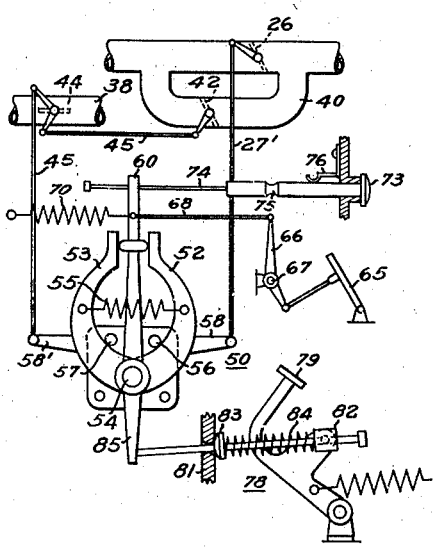
Fig. 6 is a view similar to Fig. 4 but with the clutch disengaged.

Fig. 6 is similar to Fig. 4 and shows the hand throttle in the same position as Fig. 4, but with the clutch disengaged. It will be noted that the lever 53 has been brought up to idling position with the by-pass valve 42 closed and the exhaust manifold valve 44 open, thus permitting the engine to idle in the usual manner.

Figure 5:
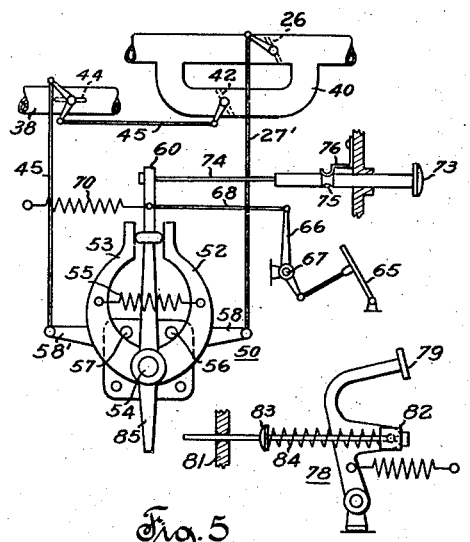
Fig. 5 is a view similar to Fig. 4 but with the hand throttle set for idling.

Fig. 5 shows a similar situation to Fig. 4, but with the hand throttle pulled out to the "off" position. In this position the valve 42 is prevented from opening and the valve 44 is maintained fully open.

Figure 7:
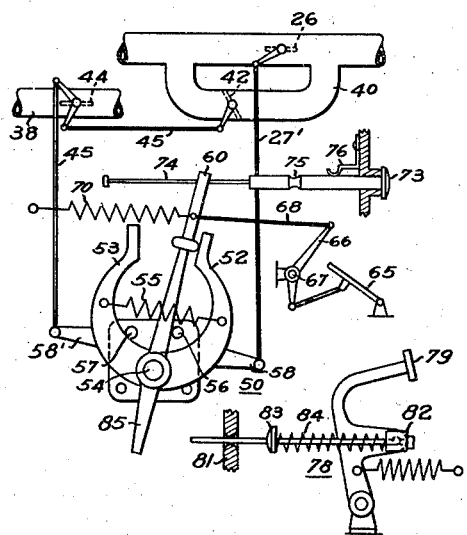
Fig. 7 is a view similar to Fig. 4 but showing the gas being fed into the engine.

Fig. 7 shows gas being applied by the accelerator.

If a six cylinder engine is used, three exhaust manifolds should be employed to give best results. Each manifold should connect one pair of cylinders as shown in Fig. 3, and be controlled by an exhaust manifold valve 44. The exhaust manifold valves 44 are connected to operate in unison.

As shown in Fig. 2, a four cylinder engine requires but a single manifold with one exhaust manifold valve 44.

A V-eight engine requires two exhaust manifolds with a separate valve for each, one manifold for each group of four cylinders.

It will thus be seen that this invention provides means to keep the engine comparatively cool while at the same time prevents wear and tear on the brakes. The highly compressed air heavily laden with oxygen which enters the cylinder during the braking action and is further compressed, rises momentarily to a sufficient temperature to completely burn any free carbon which may have been deposited in the cylinder from the explosions of the gasoline. Thus the engine is not only kept comparatively cool but is also kept spotlessly clean.

Having thus described the invention it will be realized that it is susceptible to various changes and modifications falling within the range of mechanical equivalents. It is not therefore desired to limit the invention to the precise form herein shown and described, but only by the scope of the appended claims.

What is claimed as new and desired to secure by Letters Patent is:

1. In an automotive vehicle having an internal combustion engine including a fuel supply, an accelerator governing said supply, an air intake passage, an exhaust passage, and a clutch pedal, a speed control for said vehicle comprising, a by-pass for said fuel supply, a valve adapted to completely shut off or open said by-pass, a valve in said exhaust passage, means operated by the foot accelerator to simultaneously open said by-pass valve and close said valve in the exhaust passage when the fuel supply is at a minimum, and means connected with said clutch pedal to prevent operation of said last named means upon depressing the clutch pedal.

2. In an automotive vehicle having an internal combustion engine including a fuel supply, an accelerator governing said supply, a gas intake passage, an exhaust passage, a hand throttle, and a clutch pedal, a speed control for said vehicle comprising, a valve in said gas intake passage adapted to control the flow of gasoline to the engine, a by-pass adapted to lead air into said gas intake passage between the fuel supply and the engine, a valve adapted to open and allow air to flow through said by-pass when said first named valve is closed, a valve in said exhaust passage adapted to close simultaneously with the opening of the by-pass valve, means to control the operation of the valves from the accelerator, and means, including the clutch pedal, to maintain the exhaust valve open and the by-pass valve closed independent of the accelerator.

3. In an automotive vehicle having an internal combustion engine including a fuel supply, an accelerator governing said supply, a gas intake passage, an exhaust passage, a hand throttle, and a clutch pedal, a speed control for said vehicle comprising, a valve in said gas intake passage adapted to control the flow of gasoline to the engine, a by-pass adapted to lead air into said gas intake passage between the fuel supply and the engine, a valve adapted to open and allow air to flow through said by-pass when said first named valve is closed, a valve in said exhaust passage adapted to close simultaneously with the opening of the by-pass valve, means to control the operation of the valves from the accelerator, means, including the hand throttle, to maintain the exhaust valve open and the by-pass valve closed independent of the accelerator, and means, including the clutch pedal, to maintain the exhaust valve open and the by-pass valve closed independent of said accelerator and said throttle.

4. In an automotive vehicle including an internal combustion engine having a fuel source, a gas intake passage, a valve in said passage to govern the flow of fuel from said source to the engine, a by-pass adapted to supply air to said intake passage between the fuel source and said engine, and a valve in said by-pass adapted to open subsequently to the closing of the first named valve, a control mechanism comprising, a pair of levers pivoted on a common axis, means connecting said levers with said valves respectively, means constantly urging said levers toward each other, means to stop said levers at the points in their movements where said valves are closed, and a third lever mounted on said axis and adapted to actuate said other levers.

5. A device as recited in claim 4 including means connecting said last named lever to the accelerator pedal whereby depressing the accelerator opens the gas valve and release of the accelerator closes the gas valve and opens the by-pass valve.

6. In an automotive vehicle having an internal combustion engine including a fuel supply, an accelerator governing said supply, an exhaust passage for burnt gases and a clutch pedal, a speed control for said vehicle comprising, a valve in said exhaust passage, means to completely shut off the supply of fuel to said engine, means operated by said accelerator to operate said last named means to shut off all fuel supply to said engine, and to simultaneously start the closing of said valve, and means connected to said clutch to counteract said last named means upon depressing the clutch.

7. In an automotive vehicle having an internal combustion engine including a fuel supply, an accelerator governing the supply of fuel to said engine, an exhaust passage, a hand throttle and a foot pedal, a speed control for said vehicle comprising, a valve in said exhaust passage adapted to prevent the passage of substantially all exhaust gas when said valve is closed, means to completely cut off said fuel supply, means connecting the accelerator with said valve and said last named means whereby release of the accelerator operates the means to completely cut off the fuel supply and simultaneously close said valve, and means connected to said pedal to render the valve closing means inoperative upon depressing the pedal.

8. In an automotive vehicle having an internal combustion engine including a fuel supply, an accelerator governing said supply, an air intake passage, an exhaust passage, and a clutch pedal, a speed control for said vehicle comprising, a by-pass for said fuel supply, a valve to control the flow of air through said by-pass, a valve in said exhaust passage, means operated by the foot accelerator to simultaneously open said by-pass valve and close said valve in the exhaust passage when the fuel supply is at a minimum, and means connected with said clutch pedal to prevent operation of said last named means upon depressing the clutch pedal.

9. In an automotive vehicle having an internal combustion engine including a fuel supply, an accelerator governing said supply, a gas intake passage, an exhaust passage, a hand throttle, and a clutch pedal, a speed control for said vehicle comprising, a valve in said gas intake passage adapted to control the flow of gasoline to the engine, a by-pass adapted to lead air into said gas intake passage between the fuel supply and the engine, a valve completely closing said by-pass and adapted to open and allow air to flow through said by-pass when said first named valve is closed, a valve in said exhaust passage adapted to close simultaneously with the opening of the by-pass valve, means to control the operation of the valves from the accelerator, and means, including the clutch pedal, to maintain the exhaust valve open and the by-pass valve closed independent of the accelerator.

10. In an automotive vehicle having an internal combustion engine including a clutch, a pedal governing the operation of said clutch, a fuel supply for said engine, and an accelerator controlling said fuel supply, a speed control for said vehicle comprising, means controllable by said accelerator to build up pressure or back pressure within said engine, and means operable by said pedal to eliminate back pressure within the engine when the clutch is disengaged.

11. In an automotive vehicle having an internal combustion engine including an intake passage, an exhaust passage, a clutch, a clutch pedal governing the operation of said clutch, a fuel supply for said engine, and an accelerator governing the flow of fuel through said intake to said engine, a speed control for said vehicle comprising, means to supply a non-combustible gas to said engine, means governed by said accelerator to control the flow of gases from said exhaust and means actuated by said clutch pedal to open said exhaust and to shut off the supply of non-combustible gases to the engine.

12. In an automotive vehicle having an internal combustion engine including an intake passage, an exhaust passage, a clutch, a clutch pedal governing the operation of said clutch, a fuel supply for said engine and an accelerator governing the flow of fuel from said supply to said engine, a speed control for said vehicle comprising, means governed by said accelerator to supply a non-combustible gas to said engine, means governed by said accelerator to control the the flow of gas from said exhaust and means actuated by said clutch pedal to counteract the first and second named means.

BENJAMIN GROB.